Dec. 31, 1935.   W. LUXMORE   2,026,240
DRINK MIXER
Filed Aug. 3, 1933   3 Sheets-Sheet 1
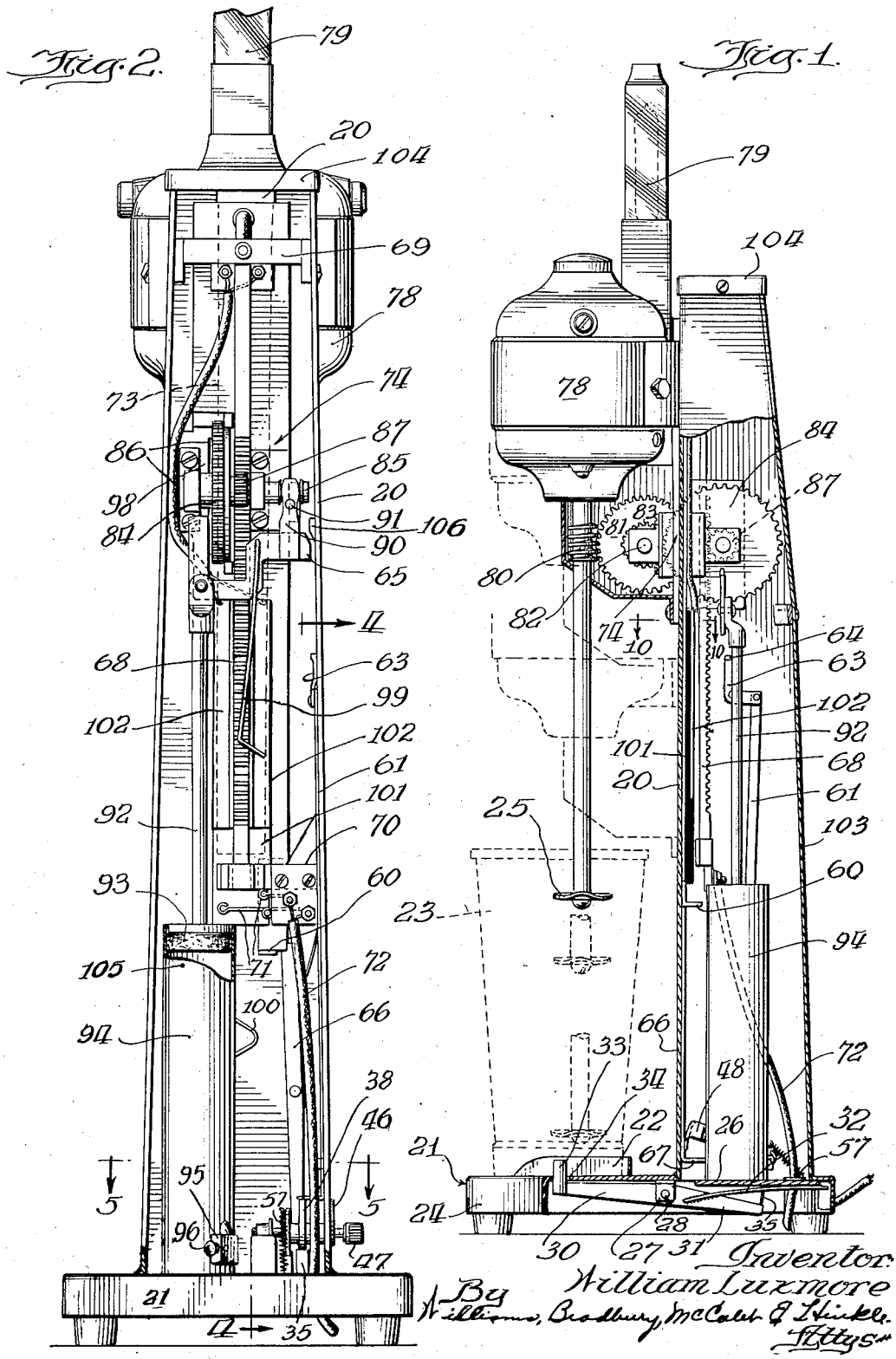

Dec. 31, 1935. W. LUXMORE 2,026,240
DRINK MIXER
Filed Aug. 3, 1933 3 Sheets-Sheet 2
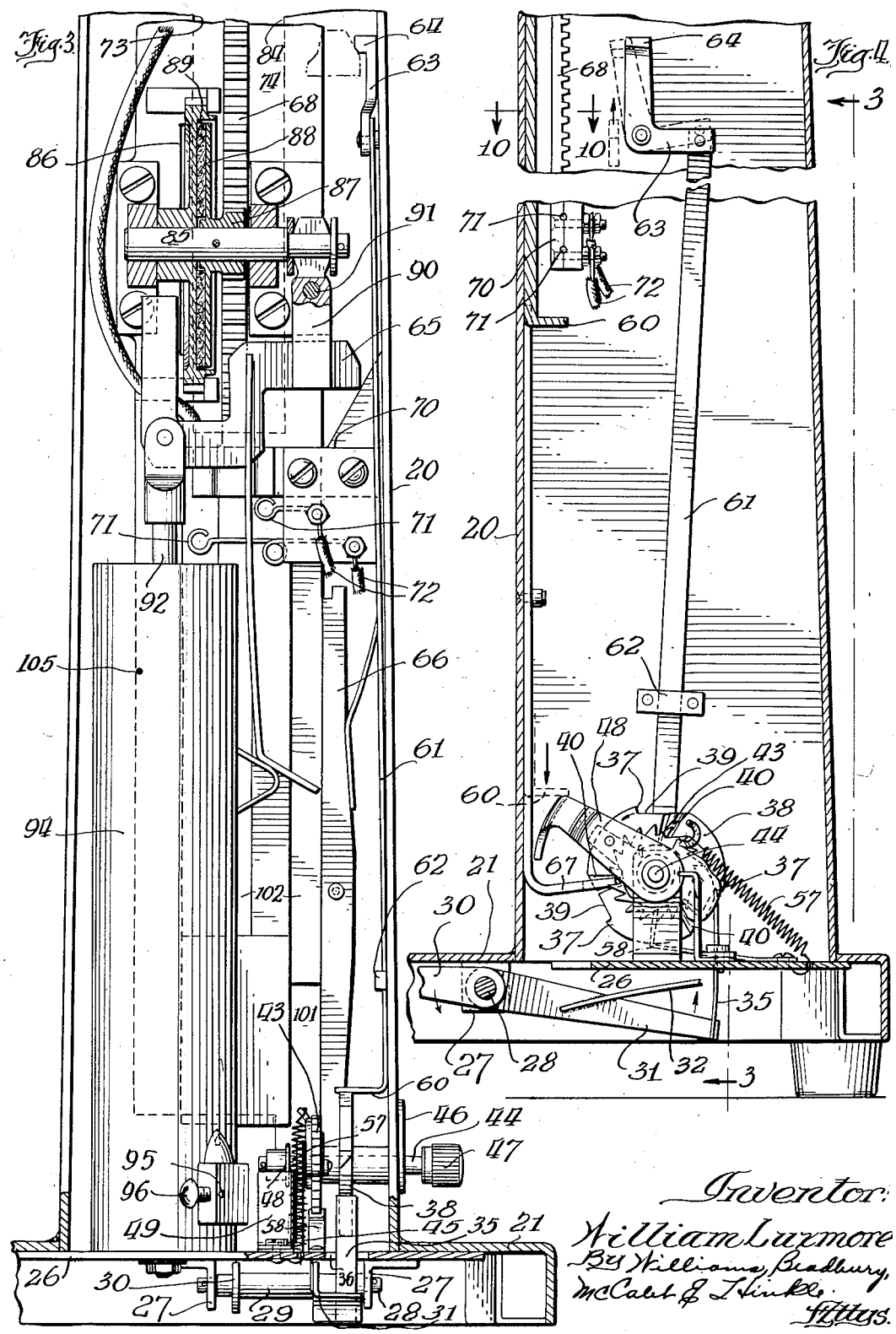
Inventor:
William Luxmore
By Williams, Bradbury,
McCaleb & Hinkle
Attys.

Dec. 31, 1935.  W. LUXMORE  2,026,240
DRINK MIXER
Filed Aug. 3, 1933  3 Sheets-Sheet 3
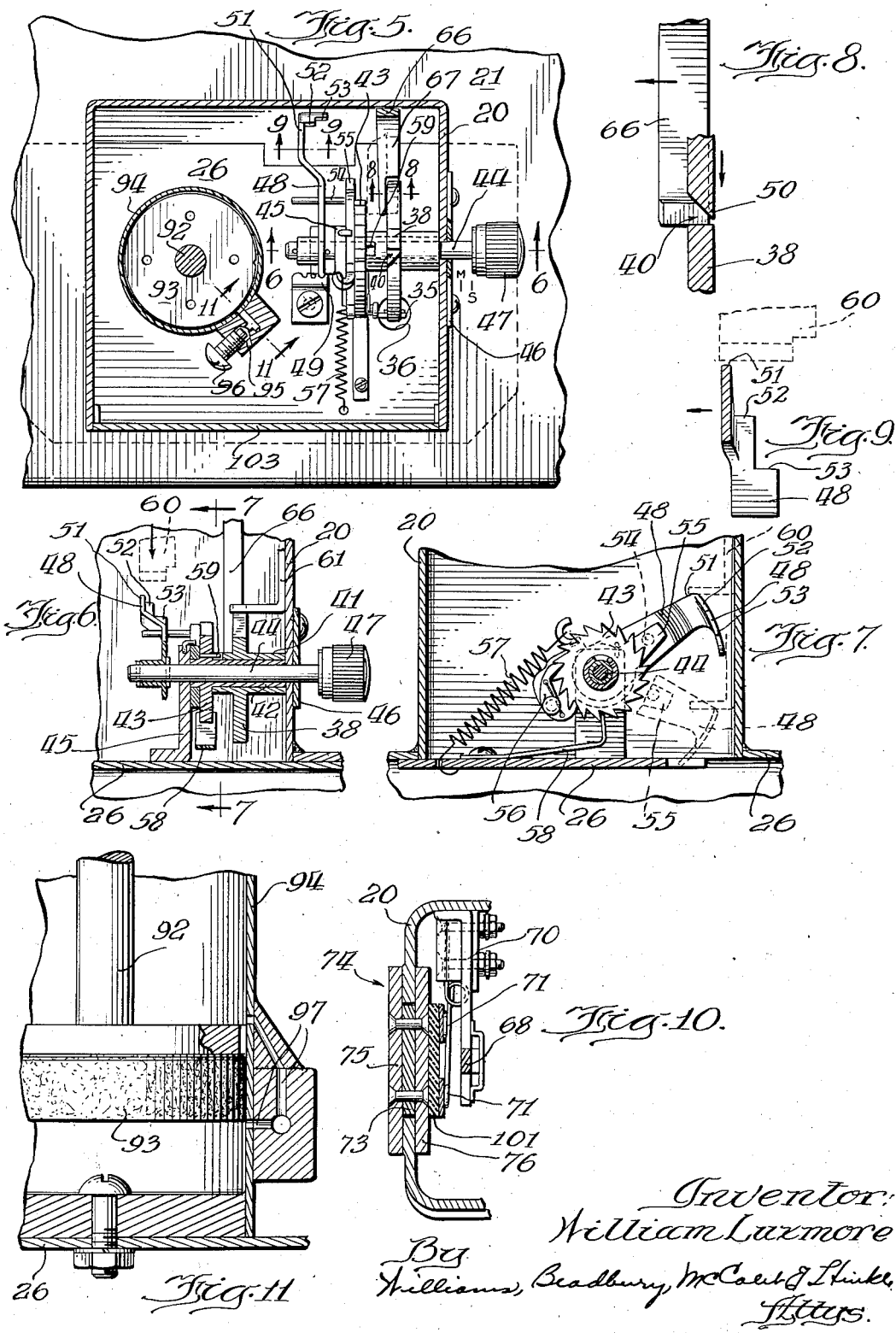

Patented Dec. 31, 1935

2,026,240

UNITED STATES PATENT OFFICE 2,026,240

DRINK MIXER

William Luxmore, Chicago, Ill., assignor of one-half to Albert G. McCaleb, Evanston, Ill.

Application August 3, 1933, Serial No. 683,447

9 Claims. (Cl. 259—99)

This invention relates to drink mixers, and has for its principal object the provision of an improved drink mixer which is adapted to mix the drink for a pre-determined and adjustable time, whereby the period of mixing can be readily adjusted to the requirements of various drinks.

The invention will readily be understood from the following description of a preferred embodiment thereof, taken in conjunction with the accompanying drawings, in which Fig. 1 is a side elevation of a drink mixer embodying my invention, the housing thereof being partly broken away to show internal mechanism;

Fig. 2 is a rear elevation of the drink mixer, on a larger scale, the back being removed to disclose internal mechanism;

Fig. 3 is a fragmentary elevation looking from the rear, and on a still larger scale, the lower portion of the mixer being shown in section taken on the line 3—3 of Fig. 4, and the clutch being also shown in section;

Fig. 4 is a fragmentary section taken on the line 4—4 of Fig. 2;

Fig. 5 is a sectional plan view taken on the line 5—5 of Fig. 2;

Fig. 6 is a fragmentary detail view taken on the line 6—6 of Fig. 5;

Fig. 7 is a fragmentary detail view taken on the line 7—7 of Fig. 6;

Fig. 8 is a fragmentary sectional detail view taken on the line 8—8 of Fig. 5;

Fig. 9 is a fragmentary sectional detail view taken on the line 9—9 of Fig. 5;

Fig. 10 is a fragmentary sectional plan view taken on the line 10—10 of Fig. 4; and Fig. 11 is a sectional detail view taken on the line 11—11 of Fig. 5.

Referring to the accompanying drawings, the reference numeral 20 designates a standard, suitably in the form of a channel. The standard 20 is preferably integral with a base 21 which projects beyond the standard towards the front and is provided with a suitable ridge 22 to hold the cup 23 in cooperative relation to the mixing element 25. The forward part of the base 21 is recessed as indicated at 24 in Fig. 1, so as to facilitate the placing of the cup on the mixer, the same being introduced by passing the edge rearwardly under the mixing element 25 when the latter is in its elevated position shown in Fig. 1. The base 21 is provided with a peripheral skirt and is also provided with feet, suitably of rubber, which project below said skirt.

The lower end of the standard 20 is substantially closed by a bridge piece 26 which is secured to the underside of the base 21. On its underside the base 21 is provided with lugs 27 which provide bearings for a pin 28 upon which is mounted a tubular element 29. The tubular element 29 rigidly carries a forwardly directed arm 30 and a rearwardly directed arm 31. A flat spring 32 rigidly mounted on the rearwardly directed arm 31 is adapted to contact with the bridge member 26 so as to tend to keep the arm 30 in its uppermost position. At its forward end the arm 30 carries an upwardly directed pin 33 which projects through an opening 34 in the base 21. This pin and opening are located substantially in the center of the cup position so that the application of the cup containing the ingredients of a drink to be mixed, upon the mixer causes the arm 30 to become depressed and the arm 31 to become correspondingly elevated.

The rearwardly directed arm 31 rigidly carries a resilient finger 35 which projects upwardly through an opening 36 in the bridge member 26. The finger 35 is adapted to engage teeth 37 on a cam wheel 38, three teeth 37 being shown in the embodiment of the invention illustrated. The teeth 37 are associated with flat surfaces 39 on the periphery of the cam wheel 38. Three slots 40 extend radially of the cam wheel 38 and open into the flat surfaces 39. The slots 40 have surfaces 50 which are oblique through the thickness of the wheel 38 for a purpose hereinafter described.

The cam wheel 38 has a tubular bearing 41 whereby it is rotatably mounted upon a bushing 42 rigidly carried by a ratchet wheel 43. The bushing 42 is rotatably mounted upon a spindle 44 which, in turn, is mounted in an opening on a bracket 45 and in an opening in the side wall of the standard 20. The standard 20 carries an escutcheon plate 46 which is also provided with an aligned opening. The outer end of the spindle 44 carries a button 47 whereby the spindle may be placed in desired position of axial adjustment. In the embodiment of the invention illustrated three positions of adjustment are provided, these positions being defined by the entrance of the hub of a lever 48 rotatably mounted on the spindle 44, the rear end of the lever 48 being adapted to engage in one of three recesses provided in the resilient member 49 mounted on the bridge member 26. The lever 48 is held against axial movement on the spindle 44 in suitable manner, for example, by means of pins on either side of its hub.

It will readily be understood from Fig. 5 that when the spindle 44 is pushed inwardly by means of its button 47, the lever 48 will be displaced inwardly into one of the two inner positions. To attain the initial position it is merely necessary to pull the button 47 outwardly.

The lever 48 extends forwardly and its forward end is provided with three contact surfaces 51, 52 and 53 located at different elevations. The lever 48 is provided with an opening through which projects a pin 54 carried by a lever 55. The lever 55 is rotatably mounted on the bushing 42 and is provided with a pawl 56 which is adapted to rotate the ratchet wheel 43 in the clockwise direction as viewed in Fig. 7, when the lever 48 is oscillated.

The lever 55 is biased by a spring 57 which tends to hold the lever 48 in its highest position. A detent 58 carried by the bridge member 26 engages the ratchet wheel 43 and prevents reverse movement thereof during return movements of the lever 48. The ratchet wheel 43 is operatively connected to the cam wheel 38, for example, by means of a pin 59 carried by the ratchet wheel 43 which extends into a slot in the hub 41 of the cam wheel 38.

The lever 48 is adapted to be actuated by means of a bar 60 which, during the operation of the mixer, is adapted to move downwardly with a fixed throw. The bar 60 is adapted to engage one of the surfaces 51, 52 or 53, depending upon the position of adjustment of the lever 48, thus determining the resulting rotation of the ratchet wheel 43 and cam wheel 38. In the embodiment of the invention illustrated, engagement of the rod 60 with the surface 51 causes the ratchet wheel 43 to be rotated three teeth, surface 52 corresponding to two teeth and surface 53 to one tooth.

The foot of a bar 61 is adapted to rest on the uppermost flat surface 39 of the cam wheel 38. The bar 61 is provided with a guide 62 on the standard 20 and its upper end is pivotally connected to a bell crank lever 63 which is pivotally mounted on the standard. The bell crank lever 63 carries a projection 64 which is adapted to be moved out of the path of a contact member 65 which will hereinafter be more fully described.

A latch 66 pivotally mounted on the front wall of the standard is provided with a rearwardly turned extension 67 which is adapted to enter one of the slots 40 to permit the latch 66 to move to latching position. It will readily be understood that when the cam wheel 38 is rotated by the resilient arm 35, the foot of the bar 61 becomes supported by an arcuate portion of the cam wheel and is thereby elevated to move the projection 64 out of the path of the contact member 65. The same rotation of the cam wheel 38 causes the sloping surface 50 of the slot 40 to move the latch 66 into unlatched position. This condition of the bell crank lever 63 and latch 66 continues until the cam wheel 38 has made one third of a turn, whereupon these elements are permitted to return to their initial positions.

Within the standard is mounted a rearwardly directed rack 68 which is parallel to the front face of the standard. The upper end of the rack is supported on a transverse member 69 and its lower end is supported on a bracket 70.

The bracket 70 also carries insulated contacts 71 which project laterally to different degrees. These contacts are connected to the leads of a cable 72 whereby power may be supplied from any suitable outlet.

The front wall of the standard 20 is provided with a longitudinal slot 73 which extends downwardly from the upper end of the standard. This slot adapts the standard for the slidably mounted motor carriage 74 which comprises a front bearing plate 75, a rear bearing plate 76 and an intermediate plate 77 which lies within the slot 73. The three plates are connected together in suitable manner, for example, by rivets.

The carriage 74 supports a motor 78 which carries the mixing element 25, and also a lamp 79 connected in parallel with the motor. The shaft of the mixing element 25 is provided with a worm 80 which is adapted to drive a gear 81. The gear 81 is rigidly mounted on a shaft 82 mounted on brackets on the front of the carriage 74. The shaft 82 also rigidly carries a pinion 83 which engages a gear 84 rotatably mounted on a shaft 85, carried by brackets 83 on the rear side of the carriage 74. The pinion 83 extends through an opening 86 in the carriage 74. The shaft 85 rigidly carries a pinion 87 which rides on the rack 68. The pinion 87 rigidly carries a disk 88 arranged adjacent the central disk-like portion of the pinion 84. Suitable fibrous material 89 is provided between these elements to provide easy clutching between them.

One end of the shaft 82 is engaged by the forked end of a lever 90 which is pivotally mounted at 91 on the carriage 74. The lever 90 carries the contact member 65 in such relation to the pivot 91 that the elements 84 and 88 are unclutched when the upwardly moving carriage 94 brings the contact member into engagement with the projection 64 on the bell crank lever 63.

The lever 90 extends transversely across the standard 20 and is pivotally connected to a depending rod 92 to the lower end of which is attached a piston 93. The piston 93 works in a dash pot cylinder 94 mounted on the bridge member 26. This cylinder is provided near its lower end with an air escape vent 95 regulated by a screw 96 and near its upper end with a vent 105 above which the piston 93 passes to its uppermost position. A by-pass 97 communicates with spaced points near the bottom of the cylinder so that the slow descending movement of the piston 93 within the cylinder 94 changes to a relative rapid final movement. The lever 90 is provided with an abutment member 98 which engages a bracket on the carriage 74 and limits the declutching movement of the lever. The lever 90 also carries a resilient downwardly directed arm 99 which is adapted to contact with the upper edge of the cylinder 94 and with a cam 100 mounted on said cylinder. The result of the engagement of the arm 99 with the cam 100 is to rotate the lever 90 in counter clockwise direction, as viewed in Fig. 2, causing the elements 84 and 88 to become clutched together to cause the carriage 74 to elevate.

The plate 76 carries on its inner side a strip of insulating material 101 which carries two conductive strips 102 adapted to contact with the contacts 71. The motor 78 and lamp 79 are connected in series with these strips 102 and it will be understood that the lamp is lit and the motor is operating all the time that the carriage is in a sufficiently low position for the contacts 71 to engage the strips 102.

The standard 20 is closed by a rear plate 103 and by a cap 104 applied to its upper end. At an elevated position the standard 20 carries a projection 106 which is adapted to engage the contact member 65 at the highest point of travel.

The operation of the mixer is as follows: The screw 96 is regulated so as to provide a basic adjustment of the time periods for which the mixer will operate. The button 47 is moved to the desired position of adjustment, which in the case of the mixer illustrated will give a mixing for two, three or six periods of oscillation of the motor carriage. This enables the time of mixing to be easily altered to suit different drinks. The cup 23 is then placed on the base 21 in the manner described above with the result that the cam wheel 38 is rotated slightly, releasing the latch 66 so that the carriage 74 moves downwardly under the action of gravity, being retarded by the action of the dash pot 94. The initial movement of the cam 38 also causes the projection 64 to move into the path of the projection 65. The projection 65 will move past the projection 64 in the downward movement of the carriage 74 because the action of the dash pot keeps the projection to the left of its position shown in Fig. 2. This action of the dash pot also keeps the elements 84 and 88 out of clutching engagement during carriage descent. When the carriage has descended to a slight extent the motor 78 starts and the lamp 79 lights. The mixing element 25 now slowly descends through the drink in the cup 23 and thoroughly mixes all parts thereof.

The downward movement of the carriage is brought to an end by engagement of the arm 99 with the cam 100 which clutches the elements 84 and 88 together so that the motor directly drives the pinion 87 upon the rack 68 and elevates the carriage, the dash pot 94 maintaining the clutching engagement until the projection 65 engages the projection 64. When this occurs the elements are declutched and the motor carriage falls by gravity, the dash pot serving to maintain said elements declutched. This oscillation of the motor carriage is continued for the number of times predetermined by the position of the button 47.

Then the cam wheel 38 will have attained a position which results in the movement of the projection 64 out of the path of the projection 65. This permits the projection 65 to pass the projection 64 and permits the motor to elevate the carriage until the strips 102 are moved above the contacts 71, whereupon the motor stops. The inertia of the armature of the motor and other rotating parts carries the carriage upwardly until the contact member 65 hits the projection 106, releasing the clutch. The release of the clutch is facilitated by the destruction of the vacuum within the cylinder 94 as a result of the piston 93 passing upwardly above the vent 105. This position of the cam wheel 38 now permits the latch 66 to move into the corresponding slot 40 and the upper end of the latch moves into locking position, as shown in Fig. 1. This latch positively maintains the carriage in its uppermost position until it is again released by the placing of a cup in operating position on the mixer.

Although the invention has been described in connection with the details of a preferred embodiment thereof, it must be understood that such details are not intended to be limitative of the invention except in so far as set forth in the accompanying claims.

Having thus described my invention, what I claim as new and desire to secure by United States Letters Patent is:

1. A drink mixer comprising a standard, a motor having a stirrer, and a cup support mounted on the standard for relative reciprocation, driving means operatively connected to said motor, means associated with said cup support cooperating with the drive means for effecting relative movement between the stirrer and cup-support in one direction, movement in the other direction being effected by gravity, a dashpot mechanism controlling the rapidity of last said movement, said driving means including a clutch, and means connecting the dashpot mechanism to said clutch for controlling the clutch.

2. A drink mixer comprising a standard, a motor having a stirrer, and a cup support on the standard adapted for relative reciprocation, driving means operatively connected to said motor, means associated with said cup support cooperating with the driving means for effecting relative movement between the stirrer and cup support in one direction, movement in the other direction being effected by gravity, a dashpot mechanism controlling the rapidity of last said movement, said driving means including a clutch, means connecting said dashpot to said clutch to maintain the drive clutched during movement in one direction and unclutched during movement in the opposite direction.

3. In a drink mixer, in combination, a standard, a carriage movably mounted on said standard, a motor and mixing element on said carriage, drive elements operatively connected to the motor, means on the standard cooperating with said drive elements to elevate the carriage on the standard, said drive elements including a clutch, a dashpot, and means connecting said dashpot to said clutch to maintain said clutch inoperative during downward movement of the carriage and to maintain the clutch operative during upward movement of the carriage.

4. In a drink mixer, in combination, a standard, a carriage movably mounted on said standard, a motor and mixing element on said carriage, drive means operatively connected to the motor, means on the standard cooperating with said drive elements to elevate the carriage on the standard, said drive elements including a clutch, a dashpot, means connecting said dashpot to said clutch to maintain said clutch inoperative during downward movement of the carriage, and to maintain the clutch operative during upward movement of the carriage, and clutching means operative at the end of the upward movement of the carriage to cause the downward and upward movements to be repeated.

5. In a drink mixer, in combination, a standard, a carriage movably mounted on said standard, a motor and mixing element on said carriage, drive means operatively connected to the motor, means on the standard cooperating with said drive elements to elevate the carriage on the standard, said drive elements including a clutch, a dashpot, means connecting said dashpot to said clutch to maintain said clutch inoperative during downward movement of the carriage, and to maintain the clutch operative during upward movement of the carriage, clutching means operative at the end of the upward movement of the carriage to cause the downward and upward movements to be repeated, and cam means adapted to control the movement of said declutching means into and out of operative position.

6. In a drink mixer, in combination, a standard, a carriage movably mounted on said standard, a motor and mixing element on said carriage, drive means operatively connected to the motor, means on the standard cooperating with said drive elements to elevate the carriage on the standard, said drive elements including a clutch, a dashpot, means connecting said dashpot to said clutch to maintain said clutch inoperative during downward movement of the carriage, and to maintain the clutch operative during upward movement of the carriage, clutching means operative at the end of the upward movement of the carriage to cause the downward and upward movements to be repeated, cam means adapted to control the movement of said declutching means into and out of operative position, and counter mechanism adapted to render the cam means operative after a certain number of downward and upward movements.

7. In a drink mixer, in combination, a standard, a carriage mounted thereon for vertical movement, a motor and mixing element on the carriage, drive elements operatively connected to the motor, means on said standard cooperating with the drive elements to elevate the carriage, said drive elements including a clutch, means adapted to maintain said clutch operative, means at an elevated point on said standard to render the clutch inoperative, and a latch adapted to maintain said carriage in elevated position.

8. In a drink mixer, in combination, a standard, a carriage movably mounted thereon, a motor and mixing element on said carriage, drive elements operatively connected to the motor, means on the standard cooperating with said drive elements to effect the elevation of the carriage, said drive elements including a clutch, means tending to maintain said clutch operative, a latch adapted to engage said carriage to maintain it in elevated position, and means operable by placing a cup on the drink mixer for releasing the latch.

9. In a drink mixer, in combination, a standard, a carriage slidably mounted thereon to move up and down during mixing, a motor and a mixing element thereon, stationary electrical contacts and electrical contacts on the carriage for supplying current to the motor, said stationary and movable contacts being separated in the highest position of the carriage, a latch maintaining said carriage elevated, means actuated by the placing of the cup on the mixer for releasing the latch, means limiting the upward movement of the carriage and causing it to be reversed, and means operative after a selected predetermined number of downward and upward movements to render said limiting means inoperative.

WILLIAM LUXMORE.